United States Patent [19]

Jacobs

[11] 4,093,509
[45] June 6, 1978

[54] PRODUCTION OF PULP SLURRIES EMPLOYING ISATOIC ANHYDRIDE

[75] Inventor: Richard L. Jacobs, Perrysburg, Ohio

[73] Assignee: The Sherwin-Williams Company, Cleveland, Ohio

[21] Appl. No.: 810,013

[22] Filed: Jun. 27, 1977

[51] Int. Cl.² ............................................. D21D 3/00
[52] U.S. Cl. .................................................. 162/158
[58] Field of Search .............. 162/158; 8/181; 536/32; 260/152

[56] References Cited

U.S. PATENT DOCUMENTS

| 1,567,731 | 12/1925 | Gunther | 260/152 |
| 2,150,968 | 3/1939 | Guenther et al. | 536/32 |
| 2,926,063 | 2/1960 | Reeves et al. | 536/32 |

Primary Examiner—S. Leon Bashore
Assistant Examiner—Peter Chin
Attorney, Agent, or Firm—John C. Purdue

[57] ABSTRACT

An improvement in producing aqueous slurries of wool pulp made by the Stora process is disclosed. The improvement consists of adding to the slurry from 1 to 5 percent of isatoic anhydride, based upon the weight of the pulp. It has been found that the properties of paper made from the pulp, without beating, are improved, and that the time required for beating the pulp to a given degree of freeness is shortened as a result of the presence of the isatoic anhydride in the slurry.

1 Claim, No Drawings

PRODUCTION OF PULP SLURRIES EMPLOYING ISATOIC ANHYDRIDE

BACKGROUND OF THE INVENTION

In the art of making paper, wood pulp is usually processed by a step commonly referred to as "beating". Beating is the mixing together of various materials called the furnish, in a water suspension and, by means of mechanical action which causes the cellulose fibers to be swollen, cut, frayed, macerated, and fibrillated, imparting to them properties that determine the character of the ultimate product. The furnish contains, of course, as its main constituent the fibrous wood pulp, and may include sizing, fillers, coloring matter, alum, sodium silicate, starch, etc., as required. The kind of paper to be made will determine the absence or the presence and proportions of the various materials in the furnish, as well as the type of wood pulp.

The beating treatment itself is also varied, depending on the nature and physical properties of the pulp being processed and the kind and characteristics to be made from them. The major physical changes resulting from the treatment is fiber shortening and fibrillation, although other changes do occur and affect the properties of the final product. Regardless of the type of beating treatment employed, however, it is a costly energy-consuming step in the manufacture of paper and related products. Thus, any reduction in the amount of power consumed during beating to achieve a given result is desirable.

BRIEF DESCRIPTION OF THE INVENTION

Briefly stated, the present invention is based upon the discovery that isatoic anhydride can be used to advantage in the paper-making process. Absent beating, the improvement is manifested by the properties of the paper that is made. When the pulp is beaten, the time required to achieve a given degree of freeness and, consequently, given strength and other properties in papers produced from a slurry of the pulp can be substantially reduced by the addition of 1 to 5 percent of isatoic anhydride, based upon the weight of the pulp.

DETAILED DESCRIPTION OF THE PREFERED EMBODIMENTS EXAMPLE

A sample of bleached two-stage sulfite wood pulp, made by the Stora process*, was defibered by stirring with water and then transferred to a beater. The slurry had a solids content of 1.57 percent by weight. An addition of 2 percent by weight NaOH was made, and the slurry was mixed for five minutes. The pH was found to be 10.4. Then, a 5 percent addition of isatoic anhydride, based upon the weight of the pulp was gradually added to the slurry and mixed for five minutes. A sample was taken and tested for freeness (Canadian standard freeness tester, CSF), resulting in a measurement of 690 milliliters (hereinafter "ml"). Pulp handsheets were then prepared in accordance with Technical Association of the Pulp and Paper Industry (hereinafter TAPPI) standard T-205M and the breaking length (TAPPI Standard T-220M) was determined to be 1529 meters. The remainder of the slurry in the beater was then beaten continuously, samples being removed at intervals of 2.5, 5 and 10 minutes. Those samples were similarly tested for freeness and breaking length. The results are shown in Table 1.

*Kirk & Othmer, *Encyclopedia of Chemical Technology*, Volume 16, Second edition, Interscience Publishers, 1968, pp. 714–720 and cited references.

For purposes of comparison, but not in accordance with the present invention all of the above steps were repeated except that no isatoic anhydride was added to the slurry. The freeness and breaking length measurements for those untreated controls are also shown in Table 1, below.

TABLE I

| Beating Time (Min.) | Freeness (ml.) | | Pulpsheet Breaking Length (Meters) | |
|---|---|---|---|---|
| | Untreated | Treated | Untreated | Treated |
| 0.0 | 695 | 690 | 1467 | 1529 |
| 2.5 | 660 | 654 | 2165 | 2345 |
| 5.0 | 632 | 607 | 3116 | 3507 |
| 10.0 | 555 | 528 | 4118 | 4377 |

The results indicate that, before beating, and for each of the indicated given beating times, the freeness of the pulp slurry was lower and the breaking length of the pulpsheet was greater for the samples treated with isatoic anhydride. In other words, a lower beating time is required and, thus, less power is consumed to achieve a desired level of physical properties.

Since the reaction which takes place between the isatoic anhydride and the cellulose produces anthranilate esters of cellulose, the occurence of the reaction can be detected by diazotizing the treated cellulose or wood pulp and further reacting it with beta-naphthol to form a visible dye. This was done after a sample of cellulose had been suspended in water with 1.0 percent of isatoic anhydride, based upon the weight of the cellulose: the cellulose was then separated from the water and washed. The washed cellulose was diazotized and the reslting diazonium anthranilate of cellulose was reacted with beta-naphthol. A visible dye was formed, indicating reaction between the cellulose and 1 percent of isatoic anhydride. It will be appreciated, therefore, that improvement, in the sense of a shortened beating time to achieve a given degree of freeness, can be realized when as little as 1 percent of isatoic anhydride, on the indicated basis, is used.

What I claim is:

1. A method for making paper comprising adding to an aqueous pulp slurry, based upon the weight of the pulp in the slurry, from 1 to 5 percent of isatoic anhydride to shorten the beating time required to achieve a given degree of pulp freeness as compared to the beating time required to achieve the same degree of freeness for the pulp slurry without an isatoic anhydride addition, and forming the paper sheet, whereby the paper sheet has improved dry strength as compared to a paper formed from the pulp without an isatoic anhydride addition, and beaten to the same degree of freeness.

* * * * *